United States Patent [19]
Choung

[11] Patent Number: 6,125,013
[45] Date of Patent: Sep. 26, 2000

[54] METHOD FOR DETECTING A PLAYING TIME OF A MAGNETIC TAPE

[75] Inventor: Se Young Choung, Suwon, Rep. of Korea

[73] Assignee: Samsung Electronics Co., Ltd., Kyungki-Do, Rep. of Korea

[21] Appl. No.: 08/113,034

[22] Filed: Aug. 31, 1993

[30] Foreign Application Priority Data

Aug. 31, 1992 [KR] Rep. of Korea ............... 92-15694

[51] Int. Cl.[7] ............................................. G11B 27/22
[52] U.S. Cl. .............................................. 360/137
[58] Field of Search ........................... 360/137, 74.4

[56] References Cited

U.S. PATENT DOCUMENTS

| | | | |
|---|---|---|---|
| 4,727,446 | 2/1988 | Kaaden | 360/137 |
| 4,972,288 | 11/1990 | Nishida | 360/137 |
| 4,992,892 | 2/1991 | Yamada et al. | 360/27 |
| 5,267,115 | 11/1993 | Lee | 360/137 |
| 5,365,384 | 11/1994 | Choi | 360/72.2 |

FOREIGN PATENT DOCUMENTS

| | | | |
|---|---|---|---|
| 0141084 | 9/1982 | Japan | 360/137 |
| 60-47283 | 3/1985 | Japan | 360/137 |

*Primary Examiner*—William R. Korzuch
*Attorney, Agent, or Firm*—Sughrue, Mion, Zinn, Macpeak & Seas, PLLC

[57] ABSTRACT

A method for detecting playing time of a magnetic tape in which a video signal is recorded includes the steps of computing a plurality of residual time data obtained by detecting the instantaneous position of the inserted magnetic tape while performing a high speed winding search mode and high speed rewinding search mode while the tape is loaded on a cassette tape deck of a VCR. Thus, it is very easy to recognize the playing time of the tape including a video signal.

18 Claims, 4 Drawing Sheets

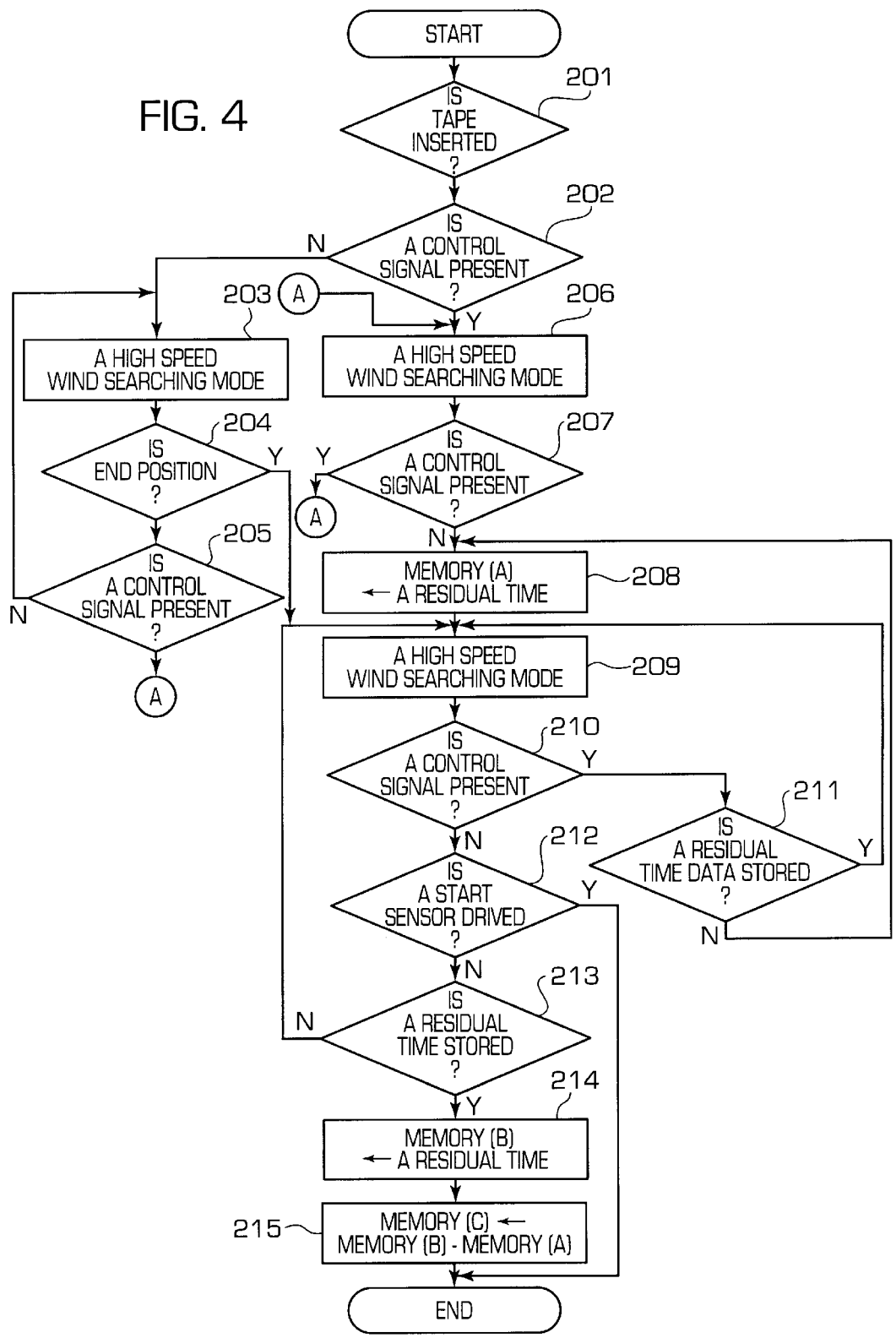

METHOD FOR DETECTING A PLAYING TIME OF A MAGNETIC TAPE

BACKGROUND OF THE INVENTION

1. Field of the Invention

The present invention relates to a method for detecting a playing time of a magnetic tape and, more specifically, to a method for detecting the playing time of a magnetic tape in which a video signal is recorded and displaying the playing time on a display unit.

2. Description of the Prior Art

In general, it frequently happens that a video signal is recorded in one portion of a tape out of the total tape length. In spite of this condition, a conventional method for detecting the residual time of a tape results in obtaining the total residual time of the tape regardless of the fact that the video signal is not recorded throughout the total length of a tape. An example of the conventional method for detecting the residual time of a tape is described in U.S. Pat. No. 4,727,446.

The present invention was motivated by a desire to overcome the problems associated with conventional detecting methods.

SUMMARY OF THE INVENTION

The principal purpose of the present invention is to provide a method for detecting and determining the residual time for a magnetic tape in a video cassette recorder (VCR).

Accordingly, it is one object of the present invention to provide a method for detecting the real playing time of a magnetic tape in which a video signal is recorded by performing a computation process using information data stored in memory and provided from a sensor.

These and other objects, features and advantages of the present invention are provided by a method for detecting the playing time of a magnetic tape which includes the steps of storing a first residual time of the magnetic tape by detecting a final position if a video signal is recorded in the magnetic tape, storing a second residual time of the magnetic tape by detecting a beginning position of a video signal recorded in the magnetic tape, storing a third residual time of the magnetic tape by subtracting said first residual time from said second residual time and increasing said third residual time in response to an operation corresponding recording/reproducing mode of operation.

These and other objects, features and advantages of the invention are disclosed in or apparent from the following description of preferred embodiments.

BRIEF DESCRIPTION OF THE DRAWINGS

The present invention will be described further, by way of example, with reference to the accompanying drawings, in which;

FIG. 4 is a flow chart illustrating a method for detecting a playing time of a magnetic tape in accordance with the present invention.

DESCRIPTION OF TEE PREFERRED EMBODIMENTS

Figure 1:
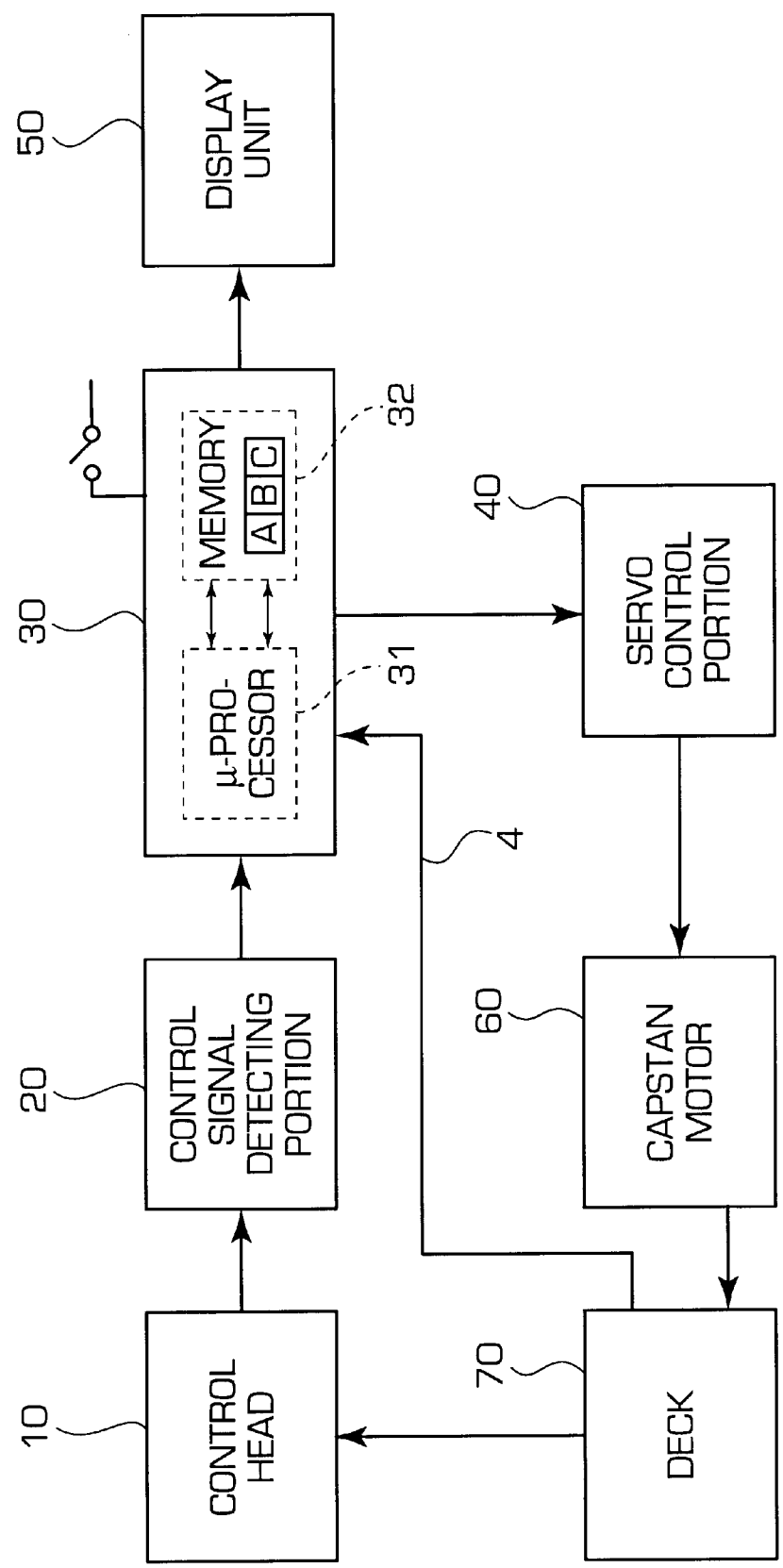
FIG. 1 is a high level block diagram which is useful in illustrating a circuit used to perform a method for detecting a playing time of a magnetic tape in accordance with the present invention.

Referring to FIG. 1, a control signal detecting circuit 20 is connected to a control head 10 in order to receive a control signal which is detected thereby. The control signal detecting circuit 20 is also connected to a microcomputer 30 which receives the control signal from the control signal detecting circuit 20, detects the instantaneous position of the tape and, afterwards, provides an output control signal. Preferably, the output signal of the control signal detecting circuit 20 is applied to microcomputer 30, which detects the instantaneous position of a tape based upon the provided output signal and which provides a driving control signal for initiating, in an exemplary case, a high speed winding operation or a high speed rewinding operation under the control of servo control circuit 40.

Again, it will be appreciated that the microcomputer 30 can detect the instantaneous position of the tape. Microcomputer 30 advantageously includes a microprocessor 31 connected to a random access memory 32. Preferably, memory 32 is segmented into a plurality of memory regions, e.g., memories A, B and C.

Preferably, upon receipt of the output control signal, servo control circuit 40 generates motor control signals applied to capstan motor 60 for moving the tape loaded into deck 70.

It will be appreciated that various signals advantageously can be used to detect the instantaneous position of a tape. In an exemplary case, a synchronizing signal in a composite video signal can be used as the control signal detected by the detecting circuit 20. Thus, if a magnetic tape is inserted into the cassette tape deck 70, a real playing time of a magnetic tape and a total residual time are always detected by the microcomputer 30, and either the former or the latter can be displayed on a display unit 50 by the selection of a switching circuit (not shown).

Figure 2:
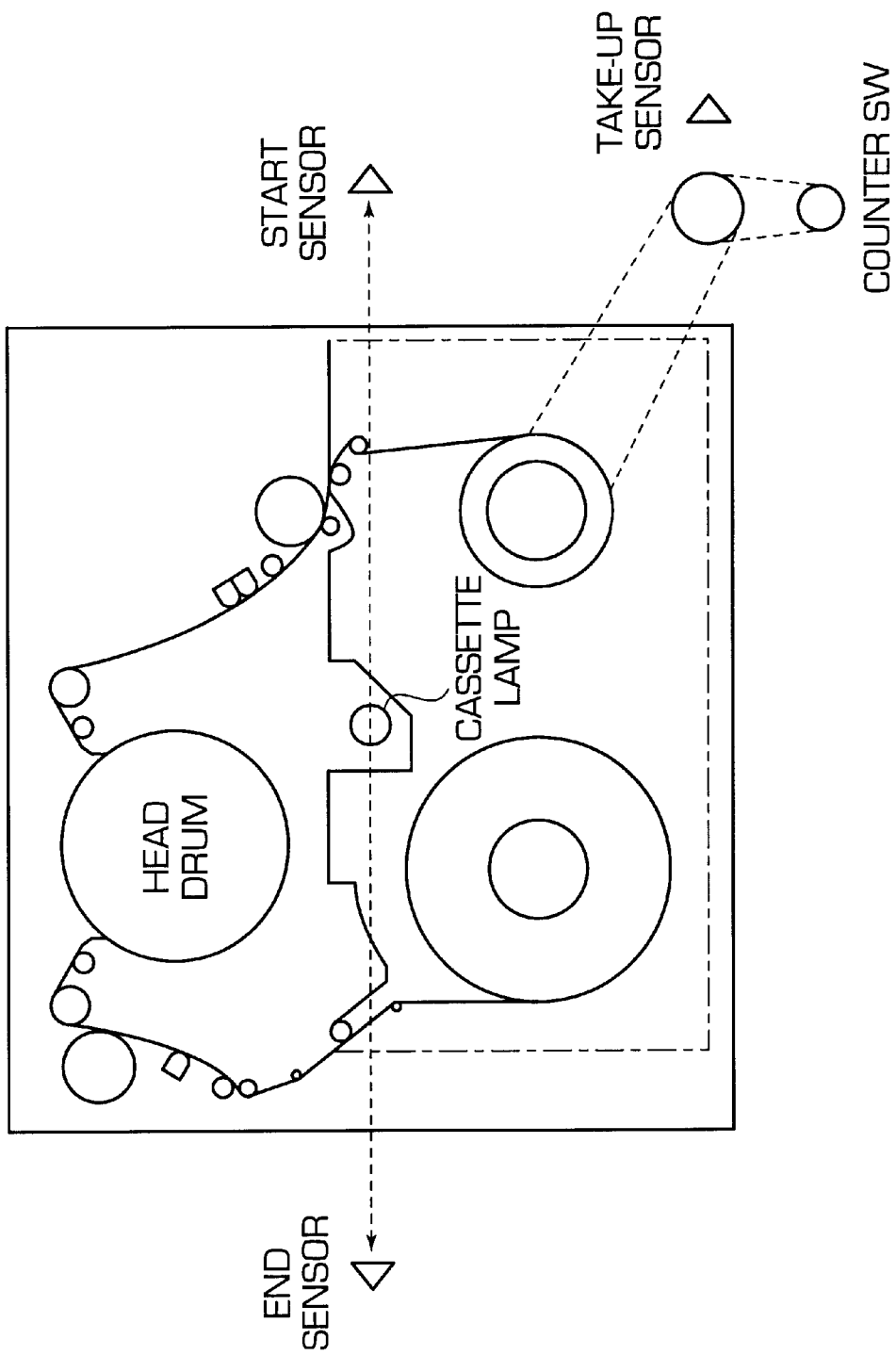
FIG. 2 is a plan view schematically showing a cassette deck of the VCR.

FIG. 2 is a plan view schematically showing a cassette deck 70 of the video cassette recorder, which advantageously includes a head drum 71, an end sensor 72, a start sensor 73, a cassette lamp 74, a take-up sensor 75 and a counter switch SW 76. The operation of the components of deck 70 will be readily understood for the discussion of the inventive method which follows.

Figure 3:
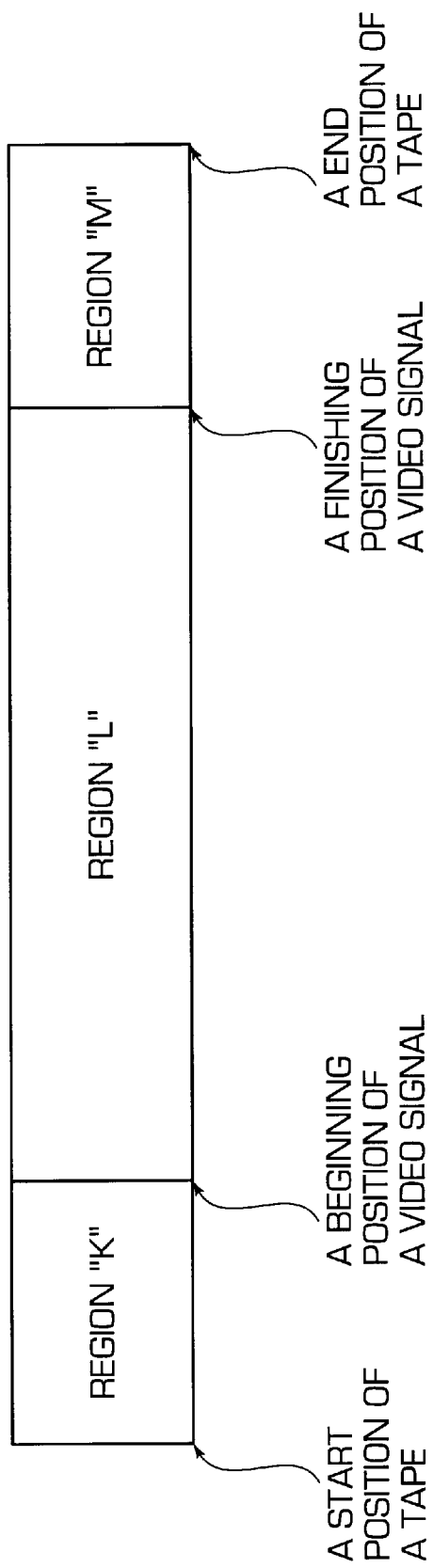
FIG. 3 is a diagram showing the total length of a tape and the position of a video signal recorded on the tape which is useful in explaining the method according to the present invention.

FIG. 3 is a diagram illustrating the total length of a recording tape. It will be noted that FIG. 3 is not drawn to scale. The tape may contain three distinct regions including a region K, which is a start region of a tape in which a video signal is not recorded, a region L, which is a region of the tape in which a video signal is recorded, and a region M, which is an end region of the tape in which a video signal has not yet been recorded.

Referring to FIGS. 1 through 3, if a tape is loaded on a rotary head drum 71 of deck 70 of the VCR, a microcomputer 30 recognizes it and initializes each memory A,B,C to a zero state in order to prepare each memory for storing respectively the residual times associated with the tape. Preferably, a first residual time of the tape is obtained by calculating the time from a finishing position of a video signal recorded on the tape to the end position of the tape. A second residual time, the total residual time of the tape, advantageously can be obtained by calculating the time from a beginning position of a video signal recorded in the tape to the finishing position of the tape. Thus, the playing time of the tape in which a video signal is recorded is obtained by performing subtraction computation for a plurality of residual times obtained in response to the instantaneous position of a tape loaded on a rotary head drum of VCR. It will be understood that the total playing time of a tape is well known to operator.

When the magnetic tape is inserted into the cassette deck 70, the instantaneous position of the tape can be one of three cases, i.e., in region K, in region L or in region M as will be appreciated from reference to FIG. 3. The preferred embodiment according to the present invention will be described for each of these cases while referring to FIGS. 1 through 4.

(1) Instantaneous Position Corresponds to the Region K

When a tape is inserted into cassette deck 70, memories A,B,C in a microcomputer 30 are initialized to a zero state during a initialization step 201 and then a control signal detecting circuit detects whether or not the control signal is present during step 202. When the control signal is not detected, the instantaneous position of the tape is judged to be one in which the video signal is not recorded, i.e., Region K or Region M. Preferably, the microcomputer 30 provides a speed controlling signal to a servo controlling circuit 40 in order to wind the tape at high speed during step 203.

While the high speed winding search mode is be performed as a result of step 203, the microcomputer 30 looks for the end position of the tape by trying to detect a signal produced by end sensor 72 of a cassette deck 70 during step 204 and then determining whether or not the control signal is present, based upon the output signal from the control signal detecting circuit 20 during step 205. If the end position of the tape is not detected and the control signal is not detected, the foregoing steps, i.e., steps 203, 204 and 205 are again performed.

During step 204, if the end position of the tape is detected by the end sensor 72, the instantaneous position of the tape is regarded as the end position of the tape in which a video signal is not recorded. During the step 205, if the control signal is detected, the instantaneous position of a tape is regarded as the starting position of the tape in which a video signal is not recorded. Control then passes to step 206 and a high speed winding search mode is performed.

In step 207, it is determined whether or not the control signal is present. If the control signal is detected, the instantaneous position of the tape is determined to correspond to the region L wherein the video signal is recorded and the program simultaneously returns to step 206. On the other hand, if the control signal is not detected, the instantaneous position of the tape is regarded as the finishing position of the tape, i.e., the common edge of Regions L and M wherein the video signal is recorded. At this time, a residual time from the finishing position to the end position of the tape is stored in the memory A during step 208.

In order to obtain the total residual time of the tape from the starting position of the tape in which a video signal is recorded to the end position of the tape, a high speed rewinding search mode is performed during step 209 followed by an attempt to detect the control signal during step 210. If the control signal is detected during the high speed rewinding search mode, the microcomputer 30 determines whether or not the total residual time of the tape has been stored in the memory A during step 211. If the residual time of the tape is present, the step 209 is again performed. However, if the residual time is not present, the residual time is recorded during step 208. Then step 209 is again performed.

If the control signal is not detected during step 210, a check is performed as to whether or not a signal from start sensor 73 is detected. If the start sensor is not operated, a check is made to determine whether or not the residual time of the tape is stored in the memory A during step 213. If the residual time of the tape from the finishing position to the end position is judged to be present in memory A, a total residual time of the tape from the start position of the tape to the end position is stored in memory B during step 214. Then, during step 215, a residual time of the tape in which a video signal is recorded is obtained by subtracting the residual time in memory A from the residual time in memory B. Thereafter, the residual time obtained from the equation "B-A" is stored in memory C and utilized to recognize a real play time of a portion of the tape in which a video signal is recorded by increasing the residual time obtained from the equation "B-A" in response to further operation of deck 70 in the corresponding record/reproducing mode.

It will be noted that other methods can be employed without departing from the method according to the present invention. In an exemplary case, if a control signal is not detected during step 202, a high speed winding search mode of step 203 is performed until either the end position is detected during step 203 or the control signal is detected during step 205. If the control signal is detected during the high speed winding search mode of step 203, the position is determined to be the beginning position of a video signal recorded in the magnetic tape, i.e., the common edge of Regions K and L.

Accordingly, the total residual time from the beginning position of a video signal to the end position is stored in memory B. Then the high speed winding search mode is continuously performed, as described with respect to steps 203 and 206, until the control signal is no longer detected. When this occurs, the instantaneous tape position is determined to be the finishing position. Accordingly, the residual time data from the finishing position to the end position is stored in memory A. With values stored in memories A and B, microprocessor 31 advantageously solves the equation B-A and stores the results, e.g., the residual time data, in memory C.

(2) Instantaneous Position Corresponds to the Region L

As explained above, when the tape is inserted into a cassette deck 70 and loaded on the rotary head drum 71, during step 201 the memories A,B,C in microcomputer 30 are respectively initialized to a zero state. In this case, since the test for the control signal during step 203 will be affirmative, step 206 will be performed until a control signal is not detected during the high speed winding search mode of step 207. When the control signal is not detected, the finishing position of the tape in which a video signal is recorded is determined and, advantageously, a residual time from the finishing position to the end position of the tape is calculated and stored in memory A.

The total residual time of the tape is obtained by detecting the control signal during the high speed rewinding search mode during step 209 and step 210, as previously discussed. At this time, if the control signal is detected, step 211 is performed to determine whether a residual time from the finishing position to the end position is stored in memory A. In this case, step 209 is repeatedly performed since the first residual time is stored in memory A, until the control signal is no longer detected. When the control signal is not detected, the step 212 is performed and, if the check for the signal indicating operation of the start sensor 73 is negative, the steps 213, 214, 215 are sequentially performed, as explained in greater detail above.

(3) Instantaneous Position Corresponds to the Region M

When a tape is inserted into the cassette deck 70 of the VCR and is loaded into a rotary head drum 71, memories A,B,C are initialized to the zero state in step 201. Then, during step 202, a check to determined whether or not the control signal is present on the tape is performed during step 202. It will be appreciated that since the tape is positioned within Region M, the answer is negative. When the control signal is not detected, step 203 is performed. Thus, when the end position is detected by the end sensor 72 of cassette tape deck 70, step 209 is performed in order to search for the finishing position and, at the same time, to determine whether or not the control signal is present. If the control signal is not detected, the starting position will be selected when the output signal of start sensor 73 is detected. Thus, if a blank tape in which no video signal has been recorded is inserted into the cassette tape deck 70, the start sensor 73 is instantly operated because a control signal is not detected during the predetermined time, and a program is ended.

On the other hand, if the control signal produced during the high speed rewinding search mode is detected, the instantaneous position of the tape is determined to be the finishing position and the residual time data stored in the memory A is checked by the microcomputer 30. If no residual time data is stored in the memory A, the step 208 is performed and the residual time is stored in the memory A, as explained above.

As explained above, the total residual time is obtained by detecting the control signal during the high speed rewinding mode, i.e., during performance of steps 209 and 210. At this time, if the control signal is detected, the step 211 is performed to detect whether or not the total residual time data is stored in memory A. While performing step 211, if the total residual time data is present, e.g., already stored, in memory A, step 209 is again performed. However, when the control signal is not present during step 210, the step 212 is performed to check for the presence of the starting position, and the steps 213, 214, 215 are subsequently performed. It will be noted that if the control signal is not detected, the instantaneous position of the tape is judged as the start position as shown in FIG. 3.

According to the present invention, not only the playing time of tape in which a video signal in recorded, but also the total residual time of the tape is alternatively displayed using display unit 50 under the control of, in an exemplary case, a key (not shown) pressed by the operator.

As explained above, the method for detecting a playing time of a magnetic tape according to the present invention advantageously can easily discern the playing time of a magnetic tape in which a video signal is recorded by appropriately computing a plurality of residual time data obtained by detecting the instantaneous position of an inserted magnetic tape, and then alternatively performing a high speed winding search mode and a high speed rewinding search mode in response to the corresponding position of the magnetic tape loaded on the a rotary head drum 71 of the VCR.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for detecting a playing time of a magnetic tape, said method comprising the steps of:
    (a) determining whether a predetermined signal is detected from the magnetic tape;
    (b) when the predetermined signal is detected, performing a high speed winding search mode of operation until said predetermined signal is not detected;
    (c) storing a first residual time of the magnetic tape in a first memory when said predetermined signal is not detected;
    (d) performing a high speed rewinding search mode of operation;
    (e) determining whether said predetermined signal is detected;
    (f) if said predetermined signal is detected, determining if said first residual time is stored in said first memory;
    (g) if said predetermined signal is not detected, storing a second residual time in a second memory;
    (h) storing a third residual time of the magnetic tape by subtracting said first residual time from said second residual time; and
    (i) increasing said third residual time in response to operation of a deck in a corresponding recording/reproducing mode of operation.

2. The method according to claim 1, wherein said predetermined signal is a synchronizing signal from a video signal.

3. The method according to claim 1, wherein said predetermined signal is a control signal provided by a control head of said deck.

4. The method according to claim 1, wherein said deck includes a control head and wherein said finishing position and said beginning position are determined in response to a control signal provided by said control head.

5. The method according to claim 1, wherein the method of detecting a playing time of a tape further comprises the step of selectively displaying alternatively on a display unit a playing time of a video signal and a total residual time of the tape.

6. A method for detecting a playing time of a magnetic tape, said method comprising the steps of:
    (a) inserting the magnetic tape into a cassette tape deck;
    (b) if a predetermined signal is detected, performing a high speed winding search mode of operation until said predetermined signal is not detected;
    (c) storing a first residual time of the magnetic tape in a first memory when said predetermined signal is not detected;
    (d) performing a high speed rewinding search mode of operation, if said first residual time of the magnetic tape is stored in said first memory;
    (e) when said predetermined signal is no longer detected during said high speed rewinding search mode of operation, storing a second residual time based on said predetermined signal detected in said high speed rewinding search mode of operation;
    (f) storing a third residual time of the magnetic tape by subtracting said first residual time from said second residual time; and
    (g) increasing said third residual time in response to an operation of said tape deck in a corresponding recording/reproducing mode of operation.

7. The method according to claim 6, wherein said predetermined signal is a synchronizing signal associated with a video signal.

8. The method according to claim 6, wherein said predetermined signal is a control signal provided by a control head.

9. The method according to claim 6, wherein said tape deck includes a control head and wherein said finishing position and said beginning position are determined in response to a control signal provided by said control head.

10. The method according to claim 6, wherein the method of detecting a playing time of a tape further comprises the step of selectively displaying alternatively on a display unit a playing time of a video signal and a total residual time of the tape.

11. A method for detecting a play time of a magnetic tape, said method comprising the steps of:

(a) inserting the magnetic tape into a cassette tape deck;

(b) if a predetermined signal is not detected, performing a high speed winding search mode of operation;

(c) when an end position of the magnetic tape is detected while performing said high speed winding search mode of operation, performing a high speed rewinding search mode of operation;

(d) performing said high speed rewinding search mode of operation if said predetermined signal is detected and if a first residual time is stored in a first memory;

(e) performing continuously said high speed rewinding search mode of operation until said predetermined signal is not detected after said predetermined signal is detected using said high speed rewinding search mode of operation;

(f) if a second predetermined signal is not detected, storing a second residual time of the magnetic tape in a second memory;

(g) storing a third residual time of the magnetic tape by subtracting said first residual time from said second residual time; and (h) increasing said third residual time in response to operation of said tape deck in a corresponding recording/reproducing mode of operation.

12. The method according to claim 11, wherein said predetermined signal is a synchronizing signal found in a video signal.

13. The method according to claim 11, wherein said predetermined signal is a control signal provided by a control head and said second predetermined signal is a sensor signal.

14. The method according to claim 11, wherein said tape deck includes a control head and wherein said finishing position and said beginning position are determined in response to a control signal provided by said control head.

15. The method according to claim 11, wherein the method of detecting a playing time of a tape further comprises the step of selectively displaying on a display unit one of a playing time of a video signal and a total residual time of the tape.

16. A method for detecting a play time of a magnetic tape in a cassette tape deck including a microcomputer receiving a control signal generated in response to detection of a selected portion of a video signal and a first position signal and a second position signal from respective first and second sensors associated with said tape deck, said method comprising the steps of:

(a) determining the presence of a blank tape when said first position signal and said second position signal are detected but said control signal is not received; and (b) calculating a first residual time, a second residual time and a third residual time based on an order of change in level of said first position signal, said second position signal and said control signal during a high speed winding search mode of operation followed by a high speed rewinding search mode of operation.

17. The method according to claim 16, wherein said control signal is a synchronizing signal associated with said video signal.

18. The method according to claim 16, wherein the method of detecting a playing time of a tape further comprises the step (c) of selectively displaying on a display unit one of a playing time of a video signal and a total residual time of the tape.

* * * * *